United States Patent
Su

(10) Patent No.: US 11,750,314 B2
(45) Date of Patent: Sep. 5, 2023

(54) SERVICE DATA PROCESSING METHOD AND APPARATUS

(71) Applicant: HUAWEI TECHNOLOGIES CO., LTD., Shenzhen (CN)

(72) Inventor: Wei Su, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 17/480,693

(22) Filed: Sep. 21, 2021

(65) Prior Publication Data

US 2022/0006550 A1    Jan. 6, 2022

Related U.S. Application Data

(63) Continuation of application No. PCT/CN2020/080076, filed on Mar. 18, 2020.

(30) Foreign Application Priority Data

Mar. 25, 2019    (CN) .......................... 201910229620.5

(51) Int. Cl.
  *H04J 14/00* (2006.01)
  *H04J 3/16* (2006.01)
  *H04L 69/22* (2022.01)

(52) U.S. Cl.
  CPC ............ *H04J 3/1664* (2013.01); *H04L 69/22* (2013.01); *H04J 2203/0076* (2013.01); *H04J 2203/0091* (2013.01)

(58) Field of Classification Search
  None
  See application file for complete search history.

(56) References Cited

U.S. PATENT DOCUMENTS 9,313,563 B1    4/2016  Mok et al.
9,553,684 B2    1/2017  Hongou
(Continued)

FOREIGN PATENT DOCUMENTS

CN    1770673 A    5/2006
CN    1842221 A    10/2006
(Continued)

OTHER PUBLICATIONS

Chinese Notice of Allowance issued in corresponding Chinese Application No. 201910229620.5, dated Sep. 28, 2021, pp. 1-4.
(Continued)

*Primary Examiner* — Sai Aung
(74) *Attorney, Agent, or Firm* — HAUPTMAN HAM, LLP

(57) ABSTRACT

This application discloses a service data processing method and apparatus, to resolve a problem of low bandwidth utilization in the conventional technology. A dynamic framing method is used. When a transmission rate of an OTN data frame increases, a length of a payload area constantly increases, while a length of an overhead area does not increase. In other words, in OTN data frames at different transmission rates, lengths of overhead areas are fixed. As the transmission rates of the OTN data frames increase, lengths of payload areas constantly increase. In this way, when the rate increases, overheads do not occupy more bandwidths, thereby improving bandwidth utilization.

22 Claims, 9 Drawing Sheets

(56) References Cited

U.S. PATENT DOCUMENTS

| | | | | |
|---|---|---|---|---|
| 2004/0114638 | A1* | 6/2004 | Matsuura | H04J 3/1658 370/537 |
| 2009/0263131 | A1* | 10/2009 | Dong | H04J 3/1658 398/58 |
| 2010/0067913 | A1 | 3/2010 | Niibe et al. | |
| 2010/0221005 | A1* | 9/2010 | Zhao | H04J 3/1652 398/52 |
| 2011/0150468 | A1* | 6/2011 | Uchida | H04J 3/14 398/45 |
| 2015/0104178 | A1* | 4/2015 | Su | H04J 3/1652 398/79 |
| 2015/0381280 | A1* | 12/2015 | Shirai | H04J 14/02 398/79 |
| 2015/0381513 | A1 | 12/2015 | Lee et al. | |
| 2017/0195077 | A1* | 7/2017 | Su | H04B 10/27 |
| 2019/0068307 | A1* | 2/2019 | Kim | H04J 14/0245 |
| 2019/0140759 | A1* | 5/2019 | Su | H04Q 11/04 |
| 2022/0239374 | A1* | 7/2022 | Su | H04B 10/272 |

FOREIGN PATENT DOCUMENTS

| | | |
|---|---|---|
| CN | 101030827 A | 9/2007 |
| CN | 101136703 A | 3/2008 |
| EP | 2106051 A1 | 9/2009 |
| EP | 3396879 A1 | 10/2018 |
| WO | 2009100386 A2 | 8/2009 |

OTHER PUBLICATIONS

Chinese Office Action issued in corresponding Chinese Application No. 201910229620.5, dated Feb. 19, 2021, pp. 1-6.
International Search Report issued in corresponding International Application No. PCT/CN2020/080076, dated Jun. 9, 2020, pp. 1-12.
European Search Report issued in corresponding European Application No. 20778443.0, dated Mar. 15, 2022, pp. 1-11.
Jean-Michel Caia Fiberhome P R China: "FlexO-FR Structure Options and Considerations for 5G Mobile Fronthaul Transport;WD1112-38r1", ITU-T Draft; Study Period 2017-2020; Study Group 15; Series WD1112-38R1, International Telecommunication Union, Geneva ; CH, vol. 11/15, 12/15 Oct. 10, 2017 (Oct. 10, 2017), pp. 1-14, XP044214373, Retrieved from the Internet: URL: https://www.itu.int/ifa/t/2017/sg15/exchange/wp3/2017-10-Geneva-011_012/WD1112-38r1-FiberHome-CT FlexO_FR_Structure_Considerations.docx [retrieved on Oct. 10, 2017].

* cited by examiner

SERVICE DATA PROCESSING METHOD AND APPARATUS

CROSS-REFERENCE TO RELATED APPLICATIONS

This application is a continuation of International Application No. PCT/CN2020/080076, filed on Mar. 18, 2020, which claims priority to Chinese Patent Application No. 201910229620.5, filed on Mar. 25, 2019. The disclosures of the aforementioned applications are hereby incorporated by reference in their entireties.

BACKGROUND

Currently, as a core technology of a transport network, an optical transport network (OTN) implements flexible grooming and management of a large-capacity service.

Currently, to improve an interface rate, a layer-by-layer multiplexing manner is applied to the OTN to map a lower-order data frame to a higher-order data frame. A frame header and overheads that are of a data frame structure, for example, an OTN frame or a flexible optical transport network (flexible OTN, FlexO) frame, used by an OTN interface occupy fixed proportions in an entire data frame. The layer-by-layer multiplexing manner improves the interface rate, but causes overhead information, for example, a frame header, to occupy more bandwidths. This reduces bandwidth utilization of the interface to a specific extent.

SUMMARY

Embodiments of this application provide a service data processing method and apparatus, to resolve a problem of low bandwidth utilization in the conventional technology.

According to a first aspect, an embodiment of this application provides a service data processing method, including:

A transmit end receives service data.

The transmit end maps the service data to a plurality of OTN data frames. The OTN data frame includes an overhead area and a payload area. The payload area is used to carry the service data, the overhead area is used to carry overheads of the service data, a length of the payload area is positively correlated with a transmission rate of the OTN data frame, and a length of the overhead area is a fixed value. The transmit end sends the plurality of optical transport network OTN data frames.

The length of the overhead area is the fixed value. In other words, the length of the overhead area does not increase as the transmission rate of the OTN data frame increases.

A length of the payload area is positively correlated with a transmission rate of the OTN data frame means that the length of the payload area increases as the transmission rate of the OTN data frame increases.

The OTN data frame in this embodiment of this application is an OPU frame, an ODU frame, an OTU frame, a FlexO frame, or the like.

In the OTN data frame provided in this embodiment of this application, the length of the payload area increases as the transmission rate of the OTN data frame increases, and the length of the overhead area does not increase as the transmission rate of the OTN data frame increases. Therefore, bandwidths occupied by overhead areas of OTN data frames at different transmission rates are the same. When the rate is increased, the overheads do not occupy more bandwidths, thereby improving bandwidth utilization to a specific extent.

In a possible design, the payload area includes k×n−x payload code blocks, the overhead area includes h overhead code blocks, k corresponds to the transmission rate of the OTN data frame, k, n, and h are positive integers, and x is an integer greater than or equal to 0. For example, a value of k is directly proportional to the transmission rate of the OTN data frame. That a value of k is directly proportional to the transmission rate of the OTN data frame means that the value of k linearly increases as the transmission rate of the OTN data frame increases.

The foregoing design provides a manner of dividing the payload area and the overhead area of the OTN data frame. For example, x=0. Alternatively, n=m+h, x=h, and m is a positive integer.

In a possible design, the method further includes: The transmit end sends an identifier to a receive end. The identifier is used to identify the transmission rate of the OTN data frame.

In this embodiment of this application, interfaces at different transmission rates are configured to use frame structures at different transmission rates. To enable the receive end to correctly restore a corresponding OTN data frame, the transmission rate of the OTN data frame is indicated to the receive end by using the identifier. In this way, the receive end learns whether the transmission rate of the OTN data frame matches a rate of an interface used by the receive end.

In a possible design, that the transmit end sends an identifier to a receive end includes:

The transmit end performs forward error correction FEC encoding on each OTN data frame to obtain an FEC frame, where the FEC frame carries the identifier. Alternatively, the transmit end processes, by using a digital signal processor DSP, each OTN data frame to obtain a DSP frame, where the DSP frame carries the identifier. Alternatively, the transmit end sends the identifier through an optical supervisory channel OSC.

The foregoing design provides an example of several manners of indicating the transmission rate of the OTN data frame to the receive end.

In a possible design, that the transmit end sends an identifier to a receive end includes:

When the OTN data frame is a lower-order optical data unit ODU frame, the transmit end maps the plurality of lower-order ODU frames to at least one tributary slot of a higher-order optical data unit ODU frame and sends the higher-order ODU frame. A field used to carry overhead information of the at least one tributary slot in the higher-order ODU frame carries the identifier.

The foregoing design provides an example of another manner of indicating the transmission rate of the OTN data frame to the receive end.

In a possible design, the identifier is the value of k.

In an example, when the OTN data frame is an ODU frame, m=952, and h=1. When the transmission rate of the OTN data frame is 400 Gbit/s, k=1. Alternatively, when the transmission rate of the OTN data frame is 800 Gbit/s, k=2. Alternatively, when the transmission rate of the OTN data frame is 1600 Gbit/s, k=4.

In another example, the OTN data frame is a flexible optical transport network FlexO frame, m=65664, and h=128.

For example, when the transmission rate of the OTN data frame is 100 Gbit/s, k=1. Alternatively, when the transmission rate of the OTN data frame is 200 Gbit/s or 400 Gbit/s, k is 2 or 4 respectively.

In still another example, the OTN data frame is a flexible optical transport network FlexO frame, m=262656, and h=512.

For example, when the transmission rate of the OTN data frame is 400 Gbit/s, k=1. Alternatively, when the transmission rate of the OTN data frame is 800 Gbit/s, k=2. Alternatively, when the transmission rate of the OTN data frame is 1600 Gbit/s, k=4.

For example, in the foregoing examples of various OTN data frames, both sizes of the payload code block and the overhead code block are 10 bits or 128 bits.

In a possible design, the plurality of OTN data frames include a first-type data frame and a second-type data frame. An overhead area included in the first-type data frame carries framing indication information, and an overhead area included in the second-type data frame carries overhead information of the service data. The framing indication information and the overhead information constitute the overheads of the service data.

In the foregoing design, the framing indication information and the overhead information share a same area (the overhead area, which are also referred to as a shared area). Compared with an existing manner in which the framing indication information and the overhead information occupy fixed bandwidths in each frame, bandwidths occupied by the framing indication information and the overhead information is reduced, and then, the bandwidth utilization is improved.

In a possible design, the method further includes:

The transmit end sends a second group of data frames after sending, to the receive end, a first group of data frames formed by a plurality of consecutive first-type data frames. The second group of data frames includes the first-type data frame and the second-type data frame. When the second group of data frames is sent, there are a plurality of second-type data frames between any two first-type data frames.

In the foregoing design, the transmit end sends, at a high frequency, OTN data frames (the first group of data frames) that carry the framing indication information, so that the receive end performs framing, and then sends, at a low frequency, OTN data frames (the second group of data frames) that carry the framing indication information. Compared with the existing manner in which the framing indication information and the overhead information occupy the fixed bandwidths in each frame, the bandwidths occupied by the framing indication information and the overhead information is reduced, and then, the bandwidth utilization is improved.

In a possible design, the second group of data frames includes a plurality of multiframes, each of the plurality of multiframes includes one first-type data frame and a plurality of second-type data frames, and the first-type data frame has a same position in different multiframes.

The foregoing design provides a manner of sending, at the low frequency, the OTN data frame that carries the framing indication information.

In a possible design, the overhead area included in the OTN data frame includes a multiframe indication field. The multiframe indication field is used to indicate whether the OTN data frame is the first-type data frame or the second-type data frame.

The foregoing design provides a manner in which the receive end identifies the first-type data frame and the second-type data frame. In addition, in this embodiment of this application, the first-type data frame and the second-type data frame is further distinguished in another manner.

For example, a fixed bit is configured in the overhead area to indicate the first-type data frame and the second-type data frame.

In a possible design, that the transmit end sends a second group of data frames includes:

The transmit end sends the second group of data frames to the receive end when determining that the receive end successfully performs the framing.

In the foregoing design, after determining that the receive end successfully performs the framing, the transmit end sends, at the low frequency, the OTN data frame that carries the framing indication information. This improves a success rate of sending the service data to a specific extent.

In a possible design, a multiframe indication field of the first-type data frame included in the first group of data frames carries a first value; and that the transmit end determines that the receive end successfully performs the framing includes:

When determining that a multiframe indication field of the first OTN data frame sent by the receive end carries a second value, the transmit end determines that the receive end successfully performs the framing. The foregoing design provides a manner of determining that the framing succeeds. In addition, in this embodiment of this application, whether the framing succeeds is further determined in another manner. For example, the fixed bit is configured in the overhead area to indicate whether the framing succeeds.

According to a second aspect, an embodiment of this application provides a service data processing method, including:

A receive end receives a plurality of OTN data frames sent by a transmit end.

The OTN data frame includes an overhead area and a payload area. The payload area is used to carry the service data, and the overhead area is used to carry overheads of the service data. A length of the payload area is positively correlated with a transmission rate of the OTN data frame, and a length of the overhead area is a fixed value.

The receive end obtains the service data from the plurality of OTN data frames based on overheads carried in overhead areas in the plurality of OTN data frames.

In a possible design, the payload area includes k×n−x payload code blocks, the overhead area includes h overhead code blocks, k corresponds to the transmission rate of the OTN data frame, k, n, and h are positive integers, and x is an integer greater than or equal to 0. For example, x=0. Alternatively, n=m+h, x=h, and m is a positive integer.

In a possible design, the method further includes:

The receive end obtains an identifier sent by the transmit end. The identifier is used to identify the transmission rate of the OTN data frame.

The receive end determines, based on the identifier, whether the transmission rate of the OTN data frame sent by the transmit end matches an interface rate of the receive end.

In a possible design, that a receive end receives a plurality of OTN data frames sent by a transmit end includes:

The receive end receives a plurality of forward error correction FEC frames sent by the transmit end, and performs FEC decoding on each of the plurality of FEC frames to obtain the OTN data frame.

That the receive end obtains the identifier from the transmit end includes:

The receive end decodes each FEC frame to obtain the identifier.

In a possible design, that a receive end receives a plurality of OTN data frames sent by a transmit end includes:

The receive end receives a plurality of digital signal processor DSP frames sent by the transmit end, and processes each of the plurality of DSP frames to obtain the OTN data frame.

That the receive end obtains the identifier from the transmit end includes:

The receive end obtains the identifier form each DSP frame.

In a possible design, that the receive end obtains the identifier from the transmit end includes:

The receive end receives the identifier through an optical supervisory channel OSC.

In a possible design, that a receive end receives a plurality of OTN data frames sent by a transmit end includes:

When the OTN data frame is a lower-order optical data unit ODU frame, the receive end receives a higher-order optical data unit ODU frame. At least one tributary slot of the higher-order ODU frame is used to carry the plurality of OTN data frames.

That the receive end obtains the identifier from the transmit end includes:

The receive end obtains the identifier from a field of overhead information of the at least one tributary slot.

In a possible design, the identifier is a value of k.

In a possible design, the plurality of OTN data frames include a first-type data frame and a second-type data frame. An overhead area included in the first-type data frame carries framing indication information, and an overhead area included in the second-type data frame carries overhead information of the service data.

That the receive end obtains the service data from the plurality of OTN data frames based on overheads carried in overhead areas in the plurality of OTN data frames includes: The receive end obtains the service data from the plurality of OTN data frames based on the framing indication information and the overhead information carried in the overhead areas of the plurality of OTN data frames.

In a possible design, that a receive end receives a plurality of optical transport network OTN data frames sent by a transmit end includes: The receive end receives a second group of data frames after receiving a first group of data frames sent by the transmit end. The first group of data frames is formed by a plurality of consecutive first-type data frames. The second group of data frames includes the first-type data frame and the second-type data frame. In the second group of data frames, there are a plurality of second-type data frames between any two first-type data frames.

In a possible design, the second group of data frames includes a plurality of multiframes, each of the plurality of multiframes includes one first-type data frame and a plurality of second-type data frames, and the first-type data frames has a same position in different multiframes.

In a possible design, the shared area included in the OTN data frame includes a multiframe indication field. The multiframe indication field is used to indicate whether the OTN data frame is the first-type data frame or the second-type data frame.

That the receive end obtains the service data from the plurality of OTN data frames based on the framing indication information and the overhead information carried in the shared areas of the plurality of OTN data frames includes:

The receive end performs framing based on the framing indication information of the first-type data frame in the plurality of received OTN data frames, identifies the first-type data frame and the second-type data frame based on multiframe indication fields in the plurality of OTN data frames, and further obtains the service data from the plurality of OTN data frames based on the overhead indication information carried in the second-type data frame.

In a possible design, the method further includes:

After receiving the first group of data frames and when determining, based on the framing indication information included in the first group of data frames, that the framing is successfully performed, the receive end sends at least one first OTN data frame to the transmit end.

A multiframe indication field of the first-type data frame included in the first group of data frames carries a first value. The first OTN data frame is a first-type data frame, and a multiframe indication field of the first OTN data frame carries a second value.

That the receive end receives a second group of data frames includes: After sending the at least one first OTN data frame to the transmit end, the receive end receives the second group of data frames sent by the transmit end.

According to a third aspect, an embodiment of this application provides a service data processing apparatus. The apparatus is used in a transmit side, and includes a processor and a memory. The memory is configured to store program code. The processor is configured to read and execute the program code stored in the memory, to implement the method of the first aspect or any design of the first aspect.

According to a fourth aspect, an embodiment of this application provides a service data processing apparatus. The apparatus is used in a receive side, and includes a processor and a memory. The memory is configured to store program code. The processor is configured to read and execute the program code stored in the memory, to implement the method of the second aspect or any design of the second aspect.

According to a fifth aspect, an embodiment of this application provides a service data processing system. The system includes the apparatus according to the third aspect and the apparatus according to the fourth aspect.

According to a sixth aspect, an embodiment of this application further provides a computer storage medium. The storage medium stores a software program. When the software program is read and executed by one or more processors, the method provided in any design of the first aspect or the second aspect is implemented.

According to a seventh aspect, an embodiment of this application provides a computer program product including an instruction. When the computer program product is run on a computer, the computer is enabled to perform the method provided in any design of the first aspect or the second aspect.

According to an eighth aspect, an embodiment of this application provides a chip. The chip is connected to a memory, and is configured to read and execute a software program stored in the memory, to implement the method provided in any design of the first aspect or the second aspect.

According to a ninth aspect, an embodiment of this application provides an OTN data frame including an overhead area and a payload area. The payload area is used to carry service data, and the overhead area is used to carry overheads of the service data (including framing indication information and/or overhead information). A length of the payload area is positively correlated with a transmission rate of the OTN data frame, and a length of the overhead area is a fixed value.

For example, the overhead area is used to carry the framing indication information or the overhead information.

For example, a shared area includes a multiframe indication field, and the multiframe indication field is used to indicate that the shared area of the OTN data frame carries the framing indication information or the overhead information.

Technical solutions of the second aspect to the eleventh aspect of this application are consistent with or similar to technical solutions of the first aspect of this application, and beneficial effects achieved in each aspect and corresponding feasible implementations are similar. Details are not described herein again.

DESCRIPTION OF EMBODIMENTS

The following describes in detail embodiments of this application with reference to accompanying drawings.

Figure 1:
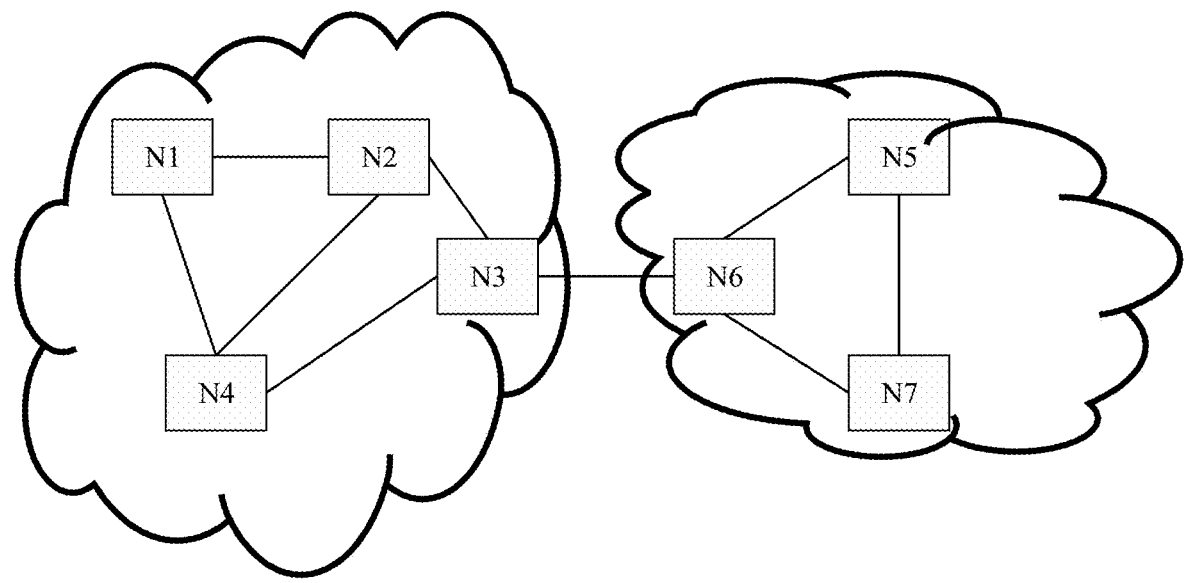
FIG. 1 is a schematic diagram of an architecture of an OTN network according to an embodiment of this application.

The embodiments of this application are applicable to an optical network, for example, an OTN. One OTN is usually formed by a plurality of devices connected through an optical fiber, and different topology types such as a linear topology, a ring topology, and a mesh topology is formed based on a parameter. An OTN shown in FIG. 1 includes two OTN networks. Each OTN network includes a specific quantity of OTN devices (N1 to N7). One OTN device has different functions based on an actual parameter. Generally, OTN devices are classified into an optical-layer device, an electrical-layer device, and an optical/electrical hybrid device. The optical-layer device is a device that processes an optical-layer signal, for example, an optical amplifier (OA), or an optical add-drop multiplexer (OADM). The electrical-layer device is a device that processes an electrical-layer signal, for example, a device that processes an OTN signal. The optical/electrical hybrid device is a device that processes an optical-layer signal and an electrical-layer signal. One OTN device integrates a plurality of different functions based on a nintegration parameter. Technical solutions provided in this application are applicable to OTN devices in different forms and having different levels of integration.

A data frame structure used by the OTN device in this embodiment of this application is an OTN data frame (or referred to as an OTN frame for short), and is used to carry various types of service data, to implement management and monitoring of the service data. The OTN frame is an ODUk, an ODUCn, or an ODUflex, is an optical transport unit (OTU) k, or an OTUCn, is a flexible OTN (FlexO) frame, or the like. The data frame structure is also another frame structure used in an optical network. In addition to being used in an inter-domain link in FIG. 1, namely, N1 and N2, the FlexO frame is used in an intra-domain network. For example, the FlexO frame is used on an OTN path including a head node, one or more intermediate nodes, and a last node.

Figure 2:
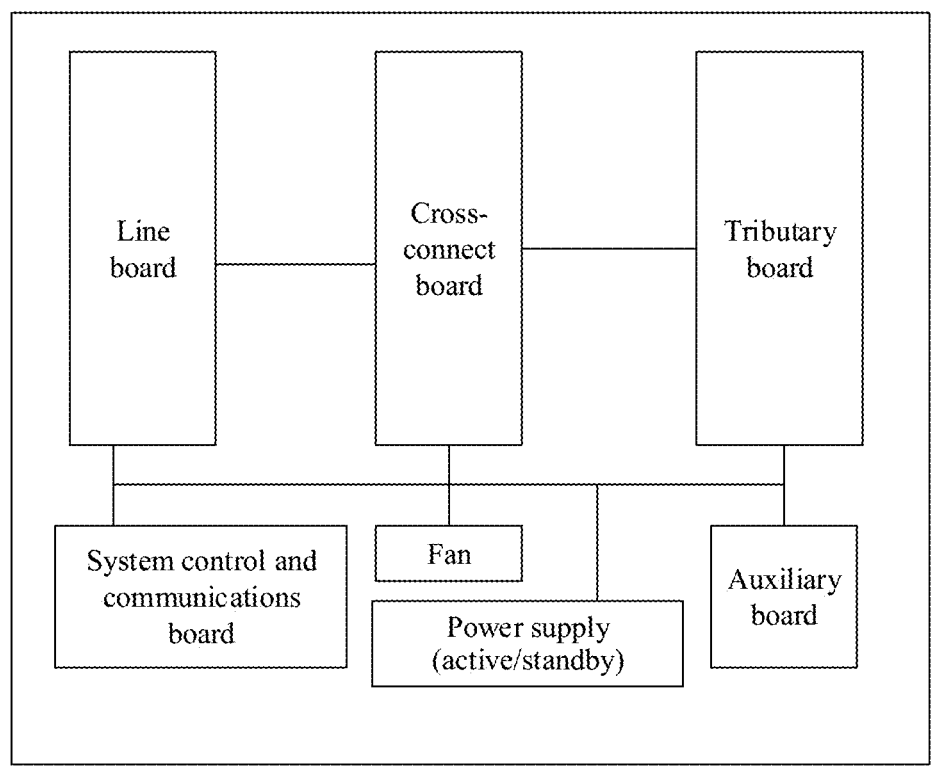
FIG. 2 is a schematic diagram of a structure of an OTN device according to an embodiment of this application.

FIG. 2 is a schematic diagram of a possible hardware structure of an OTN device. The OTN device herein refers to the OTN devices (N1 to N7) in FIG. 1. Specifically, one OTN device includes a power supply, a fan, and an auxiliary board, and further includes a tributary board, a line board, a cross-connect board, an optical-layer processing board, and a system control and communications board.

A type and quantity of boards that are specifically included in each device is different based on a parameter. For example, a network device serving as a core node has no tributary board. A network device serving as an edge node has a plurality of tributary boards. The power supply is configured to supply power to the OTN device, and includes an active power supply and a standby power supply. The fan is configured to dissipate heat for a device. The auxiliary board is configured to provide an auxiliary function, for example, providing an external alarm or accessing an external clock. The tributary board, the cross-connect board, and the line board are mainly configured to process an electrical-layer signal of the OTN device. The tributary board is configured to receive and send various client services, such as an SDH service, a packet service, an Ethernet service, and a fronthaul service. Further, the tributary board is divided into a client-side optical module and a signal processor. The client-side optical module is an optical transceiver, and is configured to receive and/or send service data. The signal processor is configured to implement mapping and demapping between the service data and a data frame. The cross-connect board is configured to implement exchange of data frames, and complete exchange of one or more types of data frames. The line board mainly processes a line-side data frame. Specifically, the line board is divided into a line-side optical module and a signal processor. The line-side optical module is a line-side optical transceiver, and is configured to receive and/or send the data frame. The signal processor is configured to multiplex and demultiplex the line-side data frame, or map and demap the line-side data frame. The system control and communications board is configured to implement system control and communication. Specifically, information is collected from different boards by using a backplane, or a control instruction is sent to a corresponding board. Unless otherwise specified, there is one or more specific components (for example, a signal processor). This is not limited in this application. A type of boards included in the device and a specific function design and quantity of the boards are not limited in this embodiment of this application.

An existing OTN frame has a fixed frame structure. For example, the OTU frame structure is a structure of four rows and 4080 byte columns. This structure includes an overhead (OH) area of four rows and 16 columns, a payload area of four rows and 3808 columns (providing a client signal bearer), and an FEC area of four rows and 56 columns (providing an error detection and error correction function).

In the OTN frame structure, a coefficient k represents a bit rate (or referred to as a transmission rate) supported by the OTN frame and different types of OPUk, ODUk, and OTUk. For example, k=0 indicates that the bit rate is 1.25 Gbit/s, k=1 indicates that the bit rate is 2.5 Gbit/s, k=2 indicates that the bit rate is 10 Gbit/s, k=Cn indicates that the bit rate is n×100 Gbit/s, and k=flex indicates that the bit rate is n×1.25 Gbit/s (n≥2). When k=0 and k=flex, an OPU0/ODU0 and an OPUflex/ODUflex exist. For an OTUCn, a frame structure of the OTUCn includes n OTUC frames. Each OTUC frame does not include an FEC area and includes four rows and 3824 byte columns. The OTUCn is sent by mapping to a FlexO (Flexible OTN) interface.

A FlexO frame structure at a transmission rate (or a data rate) of 100 Gbit/s occupies 128 rows and 5140 bit columns. A frame structure with a 100G FlexO-1 interface includes an overhead area and a payload area. The overhead area occupies the $1^{st}$ to $1280^{th}$ bit columns in the first row, and other positions are payload areas. In the following description, a data frame with a transmission rate of X Gbit/s is referred to as an X G data frame. A FlexO frame structure at a transmission rate of 200 Gbit/s occupies 128 rows and 10280 bit columns, and is formed by 10-bit interleaved multiplexing performed by two 100G FlexO-1 frames. In a frame structure with a 200G FlexO-2 interface, the $1^{st}$ to $2560^{th}$ bit columns in the first row are overhead areas, and other bits are payload areas. A FlexO frame structure at a transmission rate of 400 Gbit/s occupies 256 rows and 10280 bit columns, and is formed by the 10-bit interleaved multiplexing performed by four 100G FlexO-1 frames. In a frame structure with a 400G FlexO-4 interface, the $1^{st}$ to $5120^{th}$ bit columns in the first row are overhead areas, and other bits are payload areas.

From the foregoing example, regardless of OTU frame structures at different rates or FlexO frame structures at different rates, a size of the overhead area occupied in an entire frame structure is fixed. For example, for an OTU frame structure, an overhead area occupies 64 bytes in total. Therefore, an overhead proportion of the OTN frame structure is 64/(4×3824). For a FlexO-y frame structure, an overhead area occupies 1280×y. Therefore, an overhead proportion of the FlexO-y frame structure is (1280×y)/(128×5140×y)=1280/(128×5140). Because the overhead area occupies a fixed proportion of bandwidth, as an interface rate increases or a data frame rate constantly increases, the overhead area occupies more absolute bandwidths. As a result, interface bandwidth utilization is low. In addition, an OTN network uses layer-by-layer mapping and multiplexing to carry various services and accumulate overheads in a fixed proportion at each layer, thereby reducing bandwidth utilization while increasing the interface rate. As the interface rate increases, for example, the interface rate increases to an interface rate of a 800G data frame or a 1.6 T data frame, design difficulty of components such as an optical module is constantly increased. However, because the overhead area occupies the fixed proportion of the bandwidth, a relatively large absolute bandwidth waste exists. Consequently, design difficulty of the optical module is further increased.

Based on this, the embodiments of this application provide a service data transmission method and apparatus, and specifically provide the following three possible implementations, to resolve a problem of the foregoing absolute bandwidth waste.

In a first possible implementation, a dynamic framing method is used. When a transmission rate of an OTN data frame increases, a length of an overhead area does not increase. In other words, in OTN data frames at different transmission rates, lengths of overhead areas are fixed. The overhead area is used to carry overheads. As the transmission rates of the OTN data frames increase, lengths of payload areas constantly increase. In other words, the length of the payload area is positively correlated with the transmission rate of the OTN data frame. The overheads in the embodiments of this application include framing indication information and overhead information used for management, monitoring, and maintenance. For example, the framing indication information includes a frame alignment signal (FAS) or an alignment marker (AM). The overhead information is information other than the FAS or the AM in the overheads.

In a second possible implementation, the provided OTN data frame includes an area shared by the overhead information and the framing indication information, and the payload area. In the embodiments of this application, the area that is shared is collectively referred to as an overhead area or a shared area. Therefore, the shared area is used to carry the framing indication information or the overhead information. For ease of description, an OTN data frame that carries the framing indication information in the shared area is referred to as a first-type data frame, and an OTN data frame that carries the overhead information in the shared area is referred to as a second-type data frame.

In a third possible implementation, the first possible implementation and the second possible implementation are combined. Specifically, in the OTN data frames at the different transmission rates, the lengths of the overhead areas are fixed, and the lengths of the payload areas are positively correlated with a frame service rate. The overhead area is a shared area of the overhead information and the framing indication information.

The following describes in detail the first possible implementation.

Figure 3:
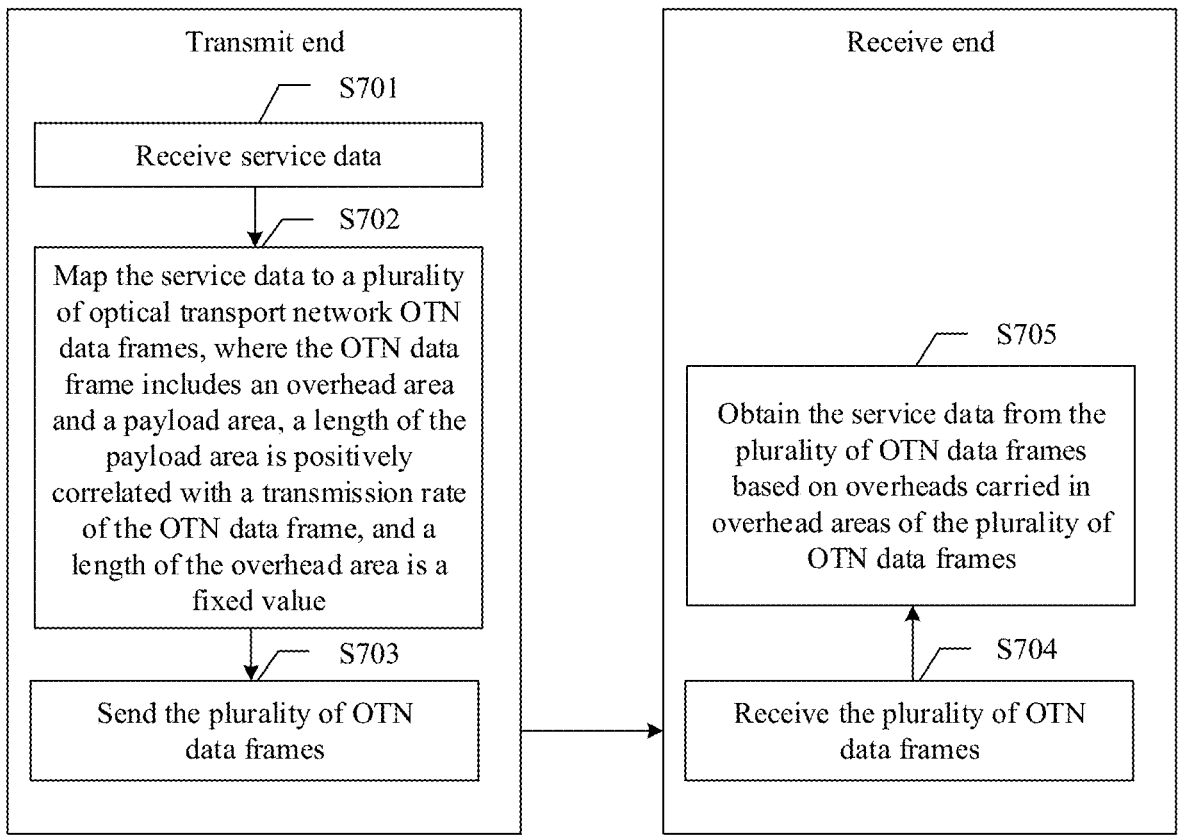
FIG. 3 is a schematic flowchart of a service data processing method according to an embodiment of this application.

FIG. 3 is a schematic flowchart of a method corresponding to the first possible implementation according to an embodiment of this application. A transmit end in this application is used in the OTN device shown in FIG. 1. For example, the transmit end is used in the tributary board and/or the line board in the OTN device shown in FIG. 2. Alternatively, the transmit end is used in a processing module disposed in the OTN device, or a chip system including one or more processing chips.

S701: The transmit end receives service data.

S702: The transmit end maps the service data to a plurality of OTN data frames, where the OTN data frame includes an overhead area and a payload area, a length of the payload area is positively correlated with a transmission rate of the OTN data frame, and a length of the overhead area is a fixed value. The overhead area is used to carry overheads of the service data.

The overheads carried in the overhead area herein include frame header information (or referred to as framing indication information), and overhead information used for management, monitoring, and maintenance. The payload area is used to carry the service data.

S703: The transmit end sends the plurality of OTN data frames.

In a possible example, the payload area includes k×n−x payload code blocks, and the overhead area includes h overhead code blocks. In other words, the h overhead code blocks are inserted into each k×n−x payload code blocks to form one OTN data frame. k is variable and corresponds to the transmission rate of the OTN data frame. For example, k=1 indicates that the transmission rate is 400 Gbit/s, and k=2 indicates that the transmission rate is 800 Gbit/s. x is an integer greater than or equal to 0. For example, x=0 or x=h. h is a positive integer, for example, h is 1. A size of the code block is any quantity of bits, for example, 128 bits, namely, 16 bytes.

Example 1: x is set to 0. In other words, the h overhead code blocks are inserted into each k×n payload code blocks to form one OTN data frame. Example 2: n=m+h, x=h, and m is a positive integer. For example, m is set to a fixed constant. In other words, the h overhead code blocks are inserted into each k×(m+h)−h payload code blocks to form one OTN data frame.

When the overhead code blocks are inserted, the overhead code blocks are inserted as a whole, or is inserted in a distributed manner. In other words, the overhead area includes a plurality of sub-areas and the sub-areas are not adjacent. Alternatively, the overhead area is one area. This is not specifically limited in this embodiment of this application.

In an example, refer to FIG. 3. After the transmit end sends the plurality of OTN data frames to a receive end, the receive end performs operations shown in S704 and S705.

S704: The receive end receives the plurality of OTN data frames.

S705: The receive end obtains the service data from the plurality of OTN data frames based on overheads carried in overhead areas of the plurality of OTN data frames.

In this embodiment of this application, interfaces at different rates use different frame structures. To enable the receive end to correctly restore a corresponding OTN data frame, the transmission rate of the OTN data frame is indicated to the receive end, so that the receive end learns whether the transmission rate of the OTN data frame matches a rate of an interface used by the receive end. An interface at a transmission rate is configured to use a frame structure whose transmission rate is less than or equal to the transmission rate.

The transmission rate of the OTN data frame is indicated to the receive end in a pre-configured manner. Alternatively, the transmission rate of the OTN data frame is indicated to the receive end in a manner in which the transmit end sends an identifier to the receive end. The identifier is used to identify a type of the OTN data frame, and different types of OTN data frames correspond to different transmission rates. In other words, the identifier further indicates the transmission rate of the OTN data frame.

The following describes an example of several manners of indicating the transmission rate of the OTN data frame to the receive end.

Manner 1: Indication of each interface is completed in a manner in which a software-defined network (SDN) controller performs software configuration. For example, a value of k of the OTN data frame is pre-configured.

Manner 2: The transmit end performs FEC encoding on each OTN data frame to obtain an FEC frame. The FEC frame carries the identifier. Therefore, after receiving a plurality of FEC frames, the receive end obtains the identifier and the OTN data frame from the FEC frame, determines, based on the identifier, whether the transmission rate of the OTN data frame matches an interface rate of the receive end, and further performs decoding, for example, performing S704 and S705.

Manner 3: The transmit end processes each OTN data frame (for example, digital-to-analog conversion, addition of information such as training sequence, and pilot sequence, and addition of an optical carrier modulation code pattern) by using a digital signal processor (DSP) to obtain a DSP frame. The DSP frame carries the identifier. Therefore, after receiving a plurality of DSP frames, the receive end obtains the identifier and the OTN data frame from the DSP frame, determines, based on the identifier, whether the transmission rate of the OTN data frame matches an interface rate of the receive end, and further performs the decoding, for example, performing S704 and S705.

Manner 4: The transmit end sends the identifier through an optical supervisory channel OSC.

For example, the identifier is the value of k. The foregoing manners 1 to 4 are applicable to a scenario in which the OTN data frame is sent as an electrical-layer digital signal.

In addition, the OTN frame used as a service channel, for example, a lower-order bearer container needs to be mapped and multiplexed to a higher-order bearer container for sending. The lower-order bearer container is, for example, a lower-order ODU frame, and the higher-order bearer container is, for example, a higher-order ODU frame. In this scenario, the following manner 5 is used to indicate the transmission rate of the OTN data frame to the receive end.

Manner 5: The transmit end maps a plurality of lower-order OTN data frames (for example, a lower-order ODU frame) to at least one tributary slot of a higher-order OTN data frame (for example, a higher-order ODU frame) and sends the higher-order OTN data frame. Therefore, a field, in the higher-order OTN data frame, that is used to carry overhead information of the at least one tributary slot carries the identifier.

For example, in MSI (Multiplex Structure Identifier) overheads of the higher-order bearer container, a transmission rate of a lower-order bearer container carried in each tributary slot is identified by using overheads corresponding to the tributary slot. For example, the transmission rate of the lower-order bearer container carried in each tributary slot is identified by using different values of k. Referring to Table 1, values of k of lower-order OTN data frames carried in tributary slots TS #1 and TS #n are 1, a value of k of a lower-order OTN data frame carried in a tributary slot TS #2 is 2, a value of k of a lower-order OTN data frame carried in a tributary slot TS #3 is 3, and a value of k in a lower-order OTN data frame carried in a tributary slot TS #4 is 4.

TABLE 1

| MSI | Types of OTN data frame |
|---|---|
| TS#1 OH | k = 1 |
| TS#2 OH | k = 2 |
| TS#3 OH | k = 3 |
| TS#4 OH | k = 4 |
| ... | ... |
| TS#n OH | k = 1 |

The following uses an example in which the OTN data frame is used in an OTN frame, for example, an ODU frame or an OTU frame.

Example 1: One OTN data frame includes k×n payload code blocks and h overhead code blocks. For example, a size of the code block is 128 bits, n=952 and n is a fixed constant, and h is a size of one code block.

Figure 4:
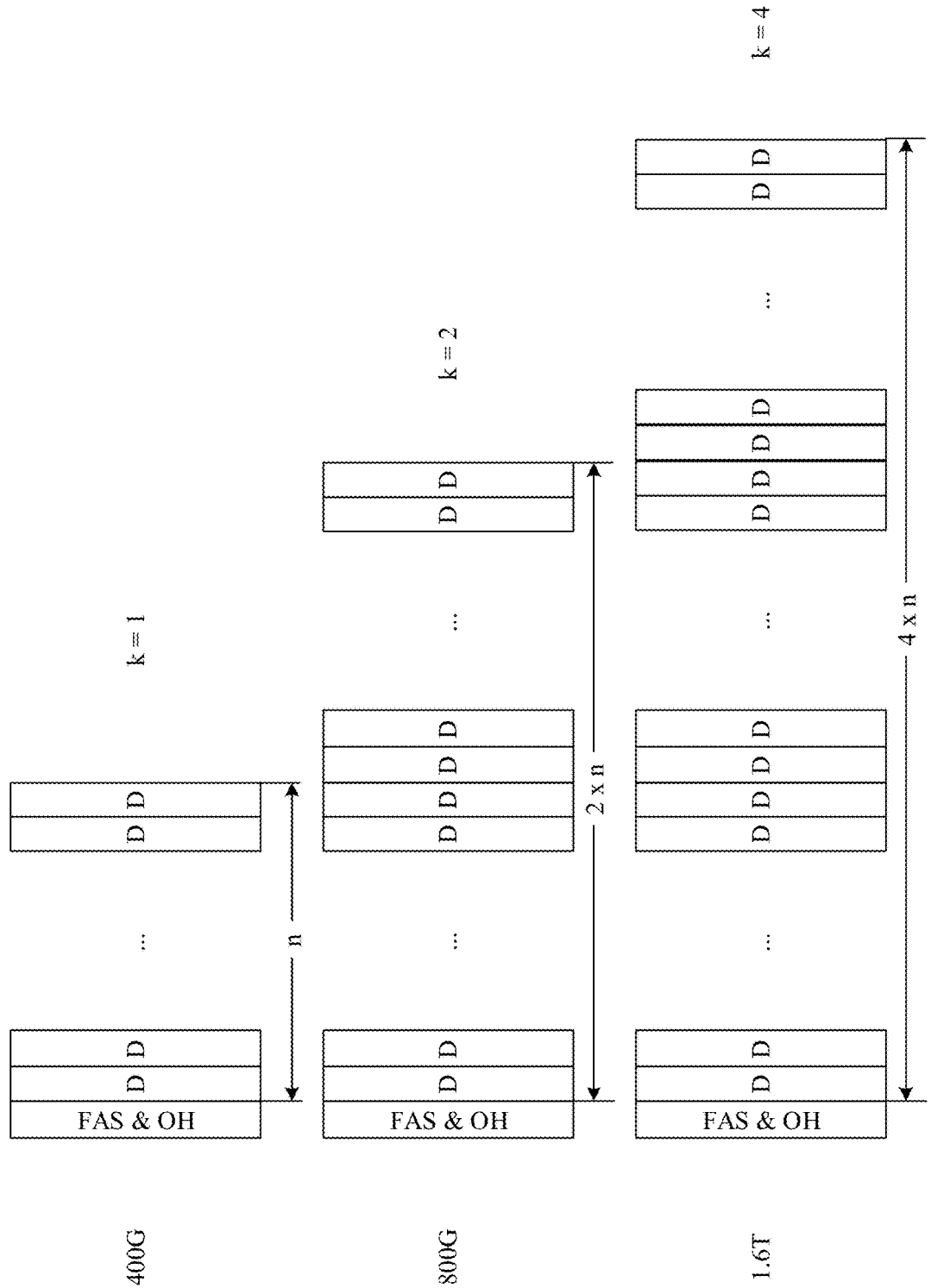
FIG. 4 is a schematic diagram of a structure of OTN data frames at different rate levels according to an embodiment of this application.

FIG. 4 shows OTN data frames respectively corresponding to three types of interfaces at different rates of 400G, 800G, and 1.6 T. FAS & OH in the figure represents an overhead code block (carrying frame header information (FAS) and overhead information (OH)), and D represents a payload code block.

(1) For the OTN data frame at the rate of 400G, k=1, one overhead code block is inserted into each m=952 128-bit payload code blocks. A formed structure of the OTN data frame includes 953 128-bits. A bandwidth occupied by overheads (frame header information and overhead information) of the formed structure of the OTN data frame in the OTN data frame is 400G×1/953=420 Mbit/s.

(2) For the OTN data frame at the rate of 800G, k=2, one overhead code block is inserted into each 2×m=2×952 128-bit payload code blocks. A formed structure of the OTN data frame includes 1905 128-bits. A bandwidth occupied by overheads of the formed structure of the OTN data frame in the OTN data frame is 800G×1/1905=420 Mbit/s.

(3) For the OTN data frame at the rate of 1.6 T, k=4, one overhead code block and overhead information are inserted into each 4×m=4×952 128-bit payload code blocks. A formed structure of the OTN data frame includes 3809 128-bits. A bandwidth occupied by overheads of the formed structure of the OTN data frame in the OTN data frame is 1.6 T×1/3809=420 Mbit/s.

For the OTN data frames corresponding to the three types of interfaces at the foregoing different rates, the bandwidths occupied by the overheads in each OTN data frame are approximately equal to 420 Mbit/s. As the interface rate increases, the bandwidth occupied by the overheads is constant. This improves interface bandwidth utilization.

Example 2: h overhead code blocks are inserted into each k×(m+h)−h payload code blocks to form one OTN data frame. In other words, one OTN data frame includes k×(m+h)−h payload code blocks and h overhead code blocks. The OTN data frame structure includes k×(m+h) code blocks. For example, a size of the code block is 128 bits, n=952 and n is a fixed constant, and h is a size of one code block.

Figure 5:
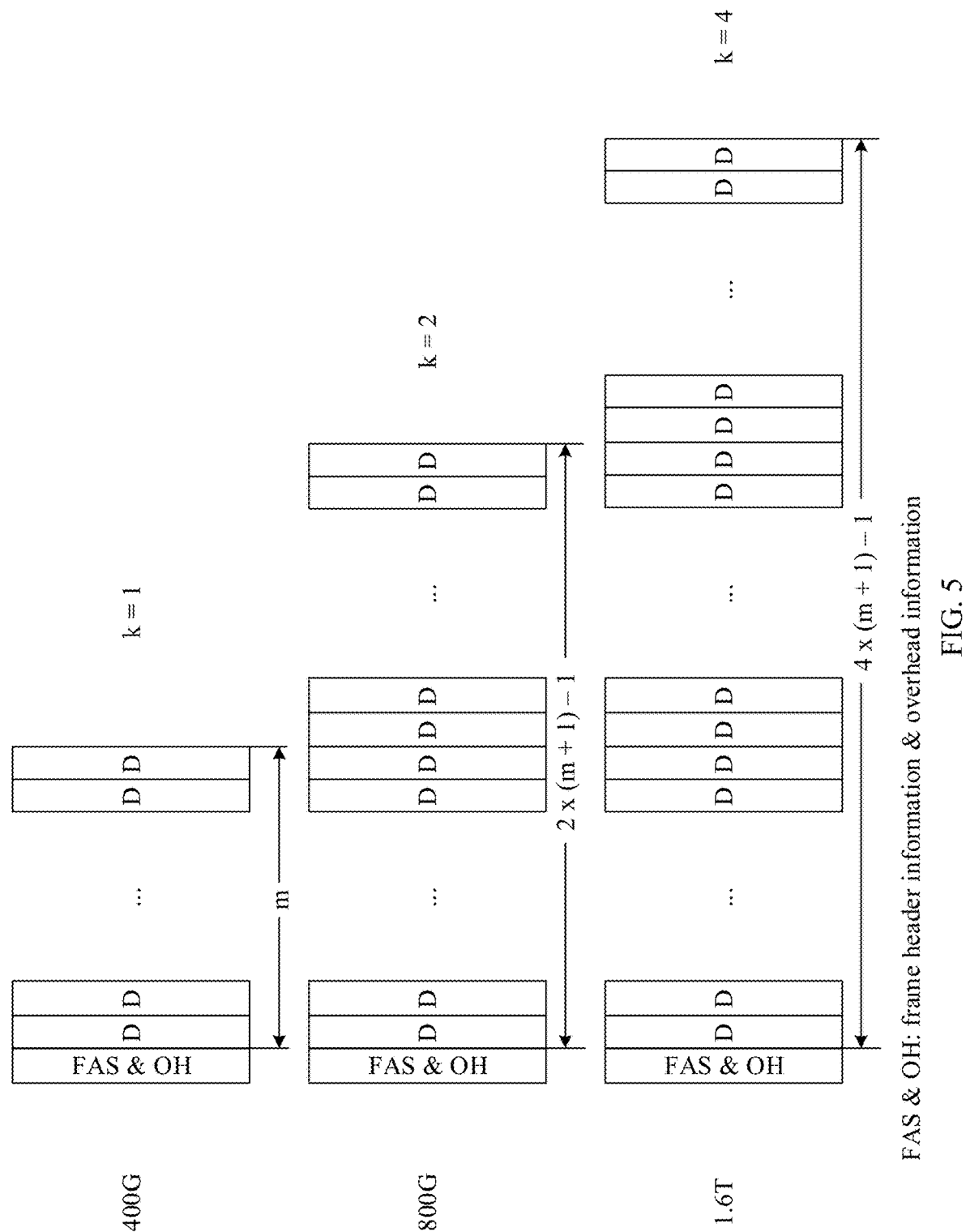
FIG. 5 is a schematic diagram of another structure of OTN data frames at different rate levels according to an embodiment of this application.

As shown in FIG. 5, OTN data frames are constructed based on three types of interfaces at different rates of 400G, 800G, and 1.6 T. Similar to the three types of OTN data frames shown in FIG. 4, in the OTN data frames shown in FIG. 5, bandwidths occupied by overheads are 420 Mbit/s. For a specific calculation method, refer to related descriptions in FIG. 4. Details are not described herein again. Different from FIG. 4, in the three types of frame structures in FIG. 5, a length of the 800G OTN data frame is twice a length of the 400G OTN data frame, and a length of the 1.6 T OTN data frame is four times the length of the 400G OTN data frame. The bandwidths occupied by the overheads in each OTN data frame are equal to a same constant value. As the interface rate increases, a case in which the overheads occupy increasingly more bandwidth resources is eliminated, to improve interface bandwidth utilization. In addition, overheads of interfaces at different rates occupy constant bandwidths and have a same processing period. This simplifies a diversified processing of the overheads. The overheads is fully reused and are easy to implement.

The following uses an example in which the OTN data frame is used in a FlexO frame.

Example 3: 100G, 200G, and 400G FlexO frame structures are constructed by using the method provided in this embodiment of this application, and is referred to as enhanced FlexO frame structures. One enhanced FlexO frame structure includes k×n payload code blocks and h overhead code blocks. For example, m=65664, a size of the code block is 10 bits, and h is a size of 128 code blocks.

(1) For a 100G enhanced FlexO-1 frame, k=1, and 128 overhead code blocks are inserted into each k×(m+h)−h=1×(65664+128)−128=65792−128 10-bit payload code blocks. The enhanced FlexO-1 frame structure includes 65792 10-bits. A quantity of bits occupied by the enhanced FlexO-1 frame is the same as that of an original 100G FlexO-1 frame structure, namely, 128 rows and 5140 bit columns. A bandwidth occupied by overheads of the enhanced FlexO-1 frame is 100G×128/65792=195 Mbit/s in the enhanced FlexO-1 frame.

(2) For a 200G enhanced FlexO-2 frame, k=2, and 128 overhead code blocks are inserted into each k×(m+h)−h=2×(65664+128)−128=2×65792−128 10-bit payload code blocks. A formed enhanced FlexO-2 frame structure includes 2×65792 10-bits. A quantity of bits occupied by the enhanced FlexO-2 frame is the same as that of an original 200G FlexO-2 frame, namely, 128 rows and 10280 bit columns. A bandwidth occupied by overheads of the enhanced FlexO-2 frame is 200G×128/(2×65792)=195 Mbit/s in the enhanced FlexO-2 frame.

(3) For a 400G enhanced FlexO-4 frame, k=4, and 128 overhead code blocks are inserted into each k×(m+h)−h=4×(65664+128)−128=4×65792−128 10-bit payload code blocks. A formed enhanced FlexO-4 frame structure includes 4×65792 10-bits. A quantity of bits occupied by the enhanced FlexO-4 frame is the same as that of an original 400G FlexO-4 frame, namely, 256 rows and 10280 bit columns. A bandwidth occupied by overheads of the enhanced 400G×128/(4×65792)=195 Mbit/s in the enhanced FlexO-4 frame.

Overhead proportions of FlexO structure corresponding to original 100G FlexO-1, 200G FlexO-2, and 400G FlexO-4 interfaces each are 1/514 (0.19%), and bandwidths occupied by overheads are respectively 195 Mbit/s, 390 Mbit/s, and 780 Mbit/s. As the interface rate increases, the bandwidth occupied by the overheads constantly increases, and bandwidth utilization becomes increasingly lower.

For the foregoing three types of enhanced FlexO frames at different transmission rates provided in this embodiment of this application, the bandwidths occupied by the overheads of the three types of enhanced FlexO frames in each enhanced FlexO frame are equal to a same constant value. As the interface rate increases, the bandwidth occupied by the overheads is constant. This improves interface bandwidth utilization.

Example 4: 400G, 800G, 1600G (1.6 T) FlexO frame structures are constructed by using the method provided in this embodiment of this application, and is referred to as enhanced FlexO frame structures. One enhanced FlexO frame includes k×n payload code blocks and h overhead code blocks. For example, m=262656, a size of a code block is 10 bits, and h is a size of 512 code blocks. A calculation method similar to that in Example 3 is used, and a bandwidth occupied by overheads of an enhanced FlexO-4 frame in the enhanced FlexO-4 frame is obtained. Both a bandwidth occupied by overheads of an enhanced FlexO-8 frame in the enhanced FlexO-8 frame and a bandwidth occupied by overheads of an enhanced FlexO-16 frame in the enhanced FlexO-16 frame are 400G×512/263168=778 Mbit/s.

The bandwidths occupied by the overheads of the three types of FlexO interfaces at different rates in FlexO frames are equal to a same constant value 778 Mbit/s. As the interface rate increases, the bandwidth occupied by the overheads is constant and is not affected. This improves bandwidth utilization.

The foregoing examples are merely intended to better describe technical solutions disclosed in this application, and do not constitute any limitation on specific applications. In an actual application, a size and an overhead proportion that are of an OTN frame structure is constructed based on a parameter.

According to the solution provided in the first possible implementation of this embodiment of this application, as the interface rate increases, the bandwidth occupied by the overheads in the OTN data frame structure no longer increases proportionally, and the bandwidth occupied by the overheads is maintained within a relatively small proper value range regardless of the interface rate, or is a constant value, thereby improving the bandwidth utilization.

The following describes in detail the second possible implementation.

In the second possible implementation, framing indication information and overhead information in the constructed OTN data frame share a same area. The area that is shared is referred to as an overhead area, a shared area, or an overhead shared area. The following uses the shared area as an example. The shared area is used to carry the framing indication information or the overhead information. For ease of description, an OTN data frame that carries the framing indication information in the shared area is referred to as a first-type data frame, and an OTN data frame that carries the overhead information in the shared area is referred to as a second-type data frame. The transmit end maps the service data to the plurality of OTN data frames that include the first-type data frame and the second-type data frame, and sends the plurality of OTN data frames to the receive end, so that after receiving the plurality of OTN data frames, the receive end obtains the service data from the plurality of OTN data frames based on the frame framing indication information and the overhead information that are carried in shared areas in the plurality of OTN data frames.

Figure 6:
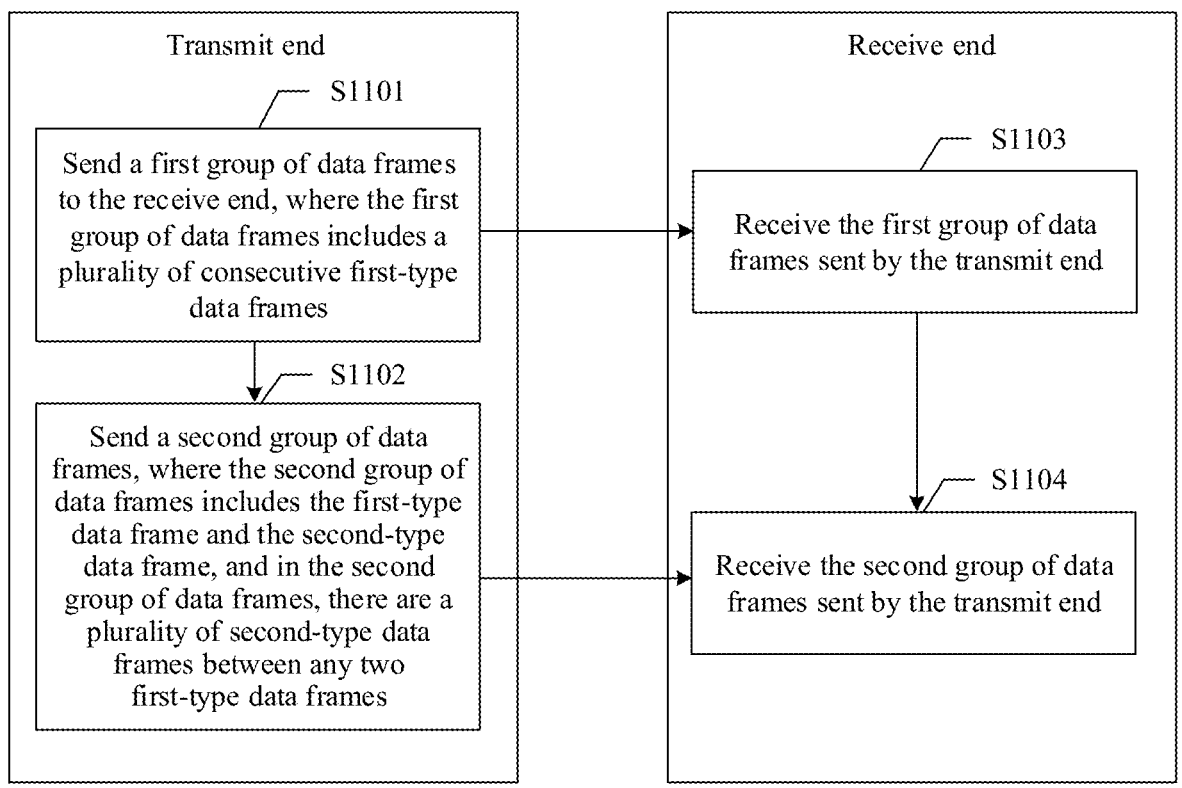
FIG. 6 is a schematic flowchart of another service data processing method according to an embodiment of this application.

The shared area means that overheads in the OTN data frame are divided into two parts. In one data frame, a part of the shared area is carried. Division of the framing indication information and the overhead information mentioned above is an example. Another manner is used based on a parameter. For example, the overheads are carried in the plurality of OTN data frames in a time division multiplexing manner. For example, the overheads are divided into a plurality of parts, and are carried in the plurality of OTN data frames in a time division multiplexing manner. With reference to FIG. 6, the following describes in detail a service data processing method provided in the second possible implementation.

S1101: The transmit end sends a first group of data frames to the receive end, where the first group of data frames includes a plurality of consecutive first-type data frames.

S1102: The transmit end sends a second group of data frames, where the second group of data frames includes the first-type data frame and the second-type data frame, and in the second group of data frames, there are a plurality of second-type data frames between any two first-type data frames.

S1103: The receive end receives the first group of data frames sent by the transmit end.

S1104: The receive end receives the second group of data frames sent by the transmit end.

According to the solution provided in the foregoing second possible implementation, when service data needs to be transmitted, the receive end generally needs to first perform framing. Therefore, the plurality of first-type data frames that are used to carry framing indication information (frame header information) is first sent in a high-frequency state, for performing the framing by the receive end. Then, the first-type data frames that carry the framing indication information are sent in a low-frequency state. After the plurality of second-type data frames are sent, the first-type data frames are sent. Based on this, because the framing indication information is not sent by each OTN data frame, and the frame header information and the overhead information do not occupy fixed bandwidths in each OTN data frame, bandwidth utilization is improved.

The first group of data frames include the first type of data frame, and further include the first type of data frame and the second type of data frame. However, a transmit frequency of the first-type of data frame in the first group of data frames is higher than that of the first-type of data frame in the second group of data frames.

In a possible example, when the second group of data frames is sent, the first-type data frame and the second-type data frame are sent according to a frame period. For example, each period includes one first-type data frame and M second-type data frames, and M is an integer greater than 1. A position of the first-type data frame is the same in each period. For example, in each period, the first-type data frame is located at a position of the first data frame, or is located at a position of the second data frame.

Figure 7:
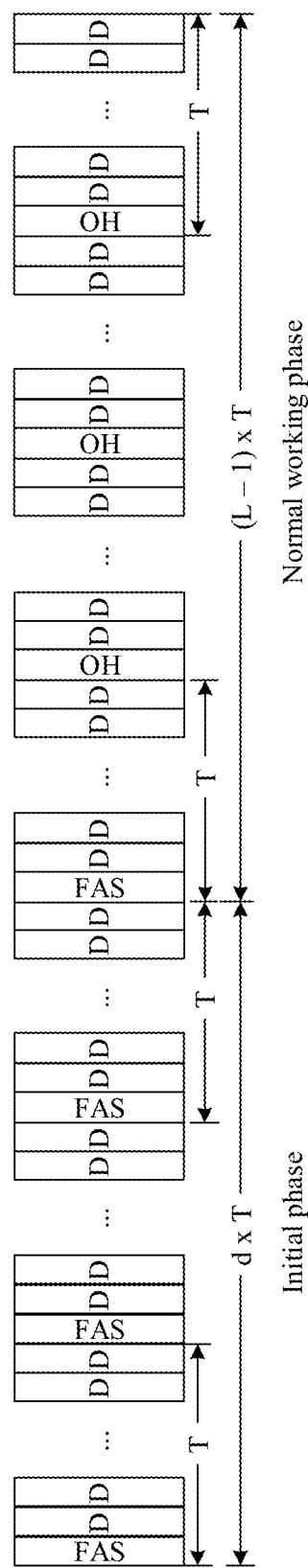
FIG. 7 is a schematic diagram of a method for sending a first-type data frame and a second-type data frame according to an embodiment of this application.

In an example, a phase in which the first-type data frame is sent at a high frequency is referred to as a fast framing phase or an initial phase. A phase in which the first-type data frame is sent at a low frequency is referred to as a normal working phase. Refer to FIG. 7.

(1) In the fast framing phase, to implement fast framing, the framing indication information (carried in an overhead area of the first-type data frame) is in a high-frequency sending state. The framing indication information is periodically sent for d times according to a frame period T, and d is a positive integer.

(2) In the normal working phase, the framing indication information enters a low-frequency sending state. The framing indication information is sent once each L×T frame period, and the overhead information is sent L−1 (=M) times each L×T frame period. In other words, the overhead information is sent by using shared areas of remaining M OTN data frames.

For example, d is equal to M or a multiple of M.

For example, one first-type data frame and M second-type data frames that are sent in each frame period forms one multiframe. In other words, the second-type data frame includes a plurality of multiframes, and each of the plurality of multiframes includes one first-type data frame and M second-type data frames.

In a possible example, the shared area of the OTN data frame includes a multiframe indication field, and the multiframe indication field is used to indicate whether the OTN data frame is the first-type data frame or the second-type data frame. The shared area further includes an overhead field. An overhead field of a shared area of the first-type data frame carries the framing indication information, and an overhead field of a shared area of the second-type data frame carries the overhead information. In this embodiment of this application, in addition to indicating the first-type data frame or the second-type data frame by using the multiframe indication field, other manners are used. For example, another dedicated bit is configured for indication.

For example, the following provides a schematic manner of information carried by the shared area, which includes but is not limited to the manner. A specific size, a pattern, and the like of the shared area are not specifically limited.

For example, in one OTN data frame, eight bytes are used as a shared area (that is, used as a shared bandwidth) of framing indication information and overhead information. The first byte is a multiframe indication field. The second to eighth bytes are overhead fields, and are used to carry the framing indication information or specific overhead information.

(1) In an initial phase, the framing indication information is in a high-frequency sending state. In other words, the first-type data frame is sent at a high frequency, as shown in Table 2.

The multiframe indication field is a first value. In Table 2, an example in which the first value is 0 is used to indicate that the second to the eighth bytes of the shared area with eight bytes of the current OTN data frame carry frame header information. The frame header information is periodically sent according to a frame period T. In this way, the receive end performs fast framing. For example, the frame header information is "0xF6F6F628282828".

(2) In a normal working phase, the frame header information enters a low-frequency sending state. In other words, the first-type data frame is sent at a low frequency, and the second-type data frame is sent at the high frequency, as shown in Table 3.

For example, in the second-type data frame, the multiframe indication field is used to indicate a type of overhead information carried in a corresponding overhead field. For example, refer to Table 3.

If the multiframe indication field is 1, a 1 indicates that the second to the eighth bytes of the shared area with eight bytes of the current OTN data frame carry path monitoring (PM) or section monitoring (SM).

If the multiframe indication field is 2, a 2 indicates that the second to the eighth bytes of the shared area with eight bytes of the current OTN data frame carry multiplex structure indication (MSI).

If the multiframe indication field is 3, a 3 indicates that the second to the eighth bytes of the shared area with eight bytes of the current OTN data frame carry justification control (JC).

If the multiframe indication field is 4, a 4 indicates that the second to the eighth bytes of the shared area with eight bytes of the current OTN data frame carry tandem connection monitoring (Tandem Connection Monitoring, TCM).

If the multiframe indication field is L, an L indicates that the second to the eighth bytes of the shared area with eight bytes of the current OTN data frame carry reserved bytes.

In an example, in the normal working phase, for example, L−1 second-type data frames are sent each time after one first-type data frame is sent. A multiframe indication field of the first-type data frame is 0, and multiframe indication fields of the L−1 second-type data frames are respectively 1 to L.

The multiframe indication field counts from 0 in a unit of OTN data frame. After the count reaches L−1, a next OTN data frame (namely, the $(L+1)^{th}$ OTN data frame) changes to 0 again. The frame header information is sent once each k×T period, and the overhead information is sent k−1 times each k×T period.

TABLE 2

| First-type data frame | Multiframe indication field | Overhead field (frame header information) |
|---|---|---|
| | 0 | F6F6F628282828 |
| | 0 | F6F6F628282828 |
| | 0 | F6F6F628282828 |
| | 0 | F6F6F628282828 |
| | 0 | F6F6F628282828 |
| | ... | ... |
| | 0 | F6F6F628282828 |

TABLE 3

| | Multiframe indication field | Overhead field (frame header information or overhead information) |
|---|---|---|
| First-type data frame | 0 | F6F6F628282828 (Frame header information) |
| Second-type data frame | 1 | SM/PM |
| | 2 | MSI |
| | 3 | JC |
| | 4 | TCM |
| | ... | ... |
| | L-1 | reserved |

In an example, eight bytes, in one OTN data frame, are used as a shared area (that is, used as a shared bandwidth) of framing indication information and overhead information. The first byte is a multiframe indication field, and is used to indicate the first-type data frame or the second-type data frame. For example, when the multiframe indication field is a first value, the first value indicates the first-type data frame. When the multiframe indication field is a third value, this indicates the second-type data frame. The second to the eighth bytes are overhead fields and are used to carry the framing indication information or specific overhead information. In the second-type data frame, the overhead field is divided into two subfields, and a first subfield is used to indicate the framing indication information. A second subfield is used to carry the specific overhead information.

In a possible example, after determining that the receive end successfully performs framing, the transmit end sends the second group of data frames to the receive end. The receive end performs the framing based on framing indication information of the first-type data frame (namely, the first group of data frames) of the received plurality of OTN data frames, then identifies the first-type data frame and the second-type data frame based on multiframe indication fields of the plurality of OTN data frames, and further obtain the service data from the plurality of OTN data frames based on the overhead information carried in the second-type data frame.

In a possible example, the multiframe indication field of the first-type data frame included in the first group of data frames carries the first value. After receiving the first group of data frames and when determining, based on the framing indication information included in the first group of data frames, that the framing is successfully performed, the receive end sends backward indication to the transmit end. The backward indication is used to indicate that the receive end successfully performs the framing. For example, at least one first OTN data frame (used as the backward indication) is sent to the transmit end. The first OTN data frame is the first-type data frame, and a multiframe indication field of the first OTN data frame carries a second value. Therefore, when determining that a multiframe indication field of the at least one first OTN data frame sent by the receive end carries the second value, the transmit end determines that the receive end successfully performs the framing, and then sends the second group of data frames to the receive end.

In a possible example, in the normal working phase, if the receive end is not continuously receiving a correct OTN data frame sent by the transmit end for reasons such as a link fault, a frame loss alarm or the like is generated, and an initial phase is re-entered for framing.

Figure 8:
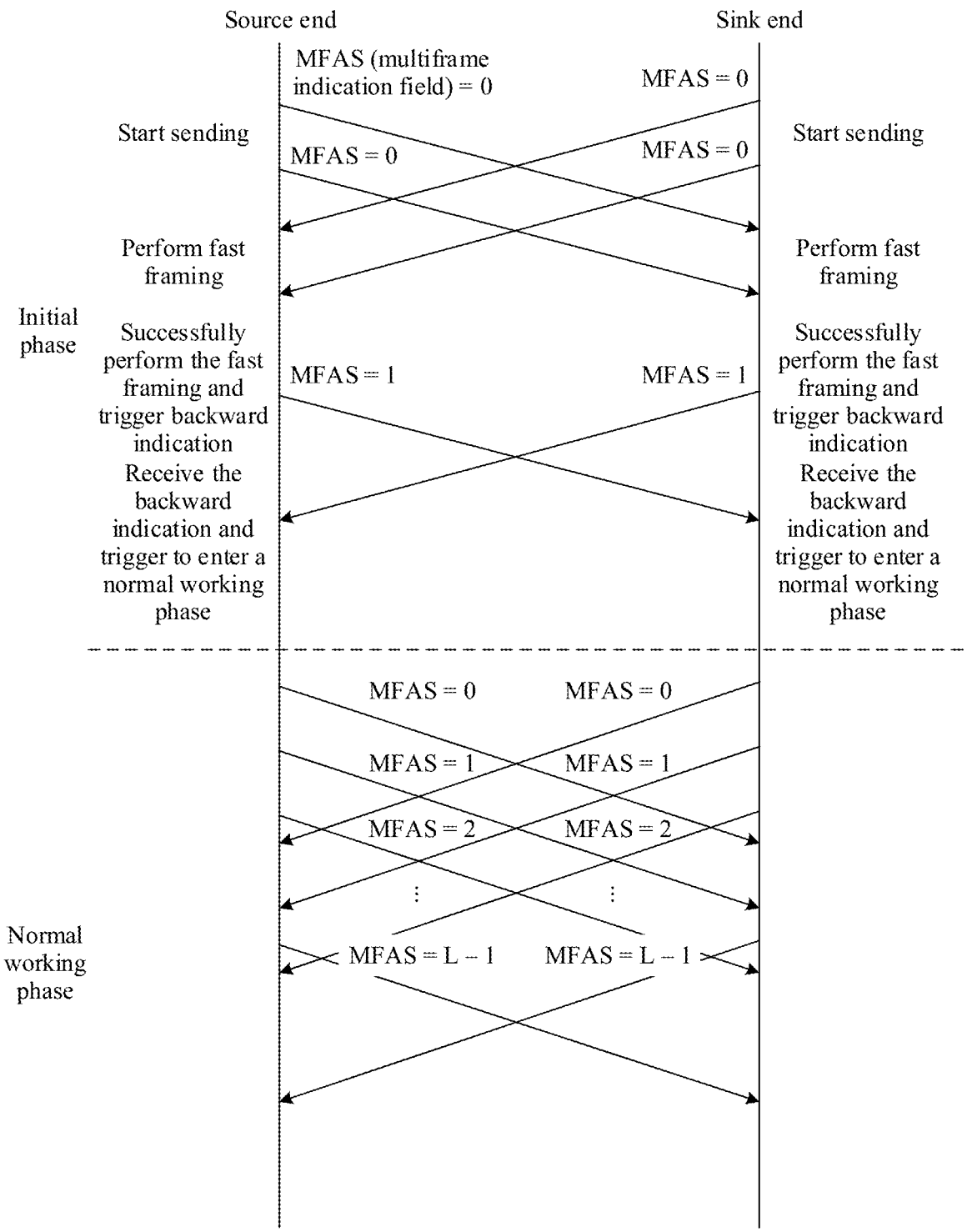
FIG. 8 is a schematic flowchart of interaction between a first OTN device and a second. OTN device according to an embodiment of this application.

As shown in FIG. 8, interaction between a first OTN device and a second OTN device is used as an example. In FIG. 8, the first OTN device is referred to as a source end, and the second OTN device is referred to as a sink end. In some OTN architectures, two OTN devices each are used as a transmit end and a receive end. In some OTN architectures, one OTN device is used as a transmit end, and the other OTN device is used as a receive end. In FIG. 8, an example in which two OTN devices each are used as the transmit end and the receive end is used. In FIG. 8, switching processing between an initial phase and a normal working phase is described by using an example in which a first value is 0 and a second value is 1.

In FIG. 8, a multiframe indication field of 0 or 1 is used to perform negotiation and framing in the initial phase. Certainly, another manner is used. For example, another dedicated bit is configured for indication.

(1) Both the first OTN device and the second OTN device are in the initial phase.

The first OTN device and the second OTN device continuously send OTN data frames to each other. A multiframe indication field of a shared area of each OTN data frame is 0, and the first OTN device and the second OTN device each perform fast framing processing in receive directions.

After successfully performing the fast framing processing in the receive directions, the first OTN device and the second OTN device each trigger backward indication. For example, after the second OTN device determines, based on a received OTN data frame, sent by the first OTN device, whose multiframe indication field is 0, that framing is successfully performed, a multiframe indication field in an OTN data frame fed back by the second OTN device to the first OTN device is 1. This indicates that the second OTN device successfully performing the framing. That is, the second OTN device is ready in the receive direction. Likewise, after the first OTN device successfully performs the framing, a multiframe indication field in an OTN data frame sent by the first OTN device to the second OTN device is 1. This indicates that the first OTN device successfully performs the framing.

Both the first OTN device and the second OTN device trigger replies to each other, and receive backward indication from each other indicating that the local ends are ready in transmit directions and the receive directions, and are triggered to enter the normal working phase.

(2) Both the first OTN device and the second OTN device are in the normal phase.

In the normal working phase, L−1 second-type data frames are sent each time after one first-type data frame is sent, and a multiframe indication field of the first-type data frame is 0. For example, multiframe indication fields of the L−1 second-type data frames are respectively from 1 to L−1. The multiframe indication field counts from 0 in a unit of OTN data frame. After the count reaches L−1, a next OTN data frame (namely, the $(L+1)^{th}$ OTN data frame) changes to 0 again. Frame header information is sent once each k×T period, and overhead information is sent k−1 times each k×T period.

In the normal working phase, if a correct OTN data frame is not continuously received in a receive direction for reasons such as a link fault, a frame loss alarm and the like is generated, and the initial phase is re-entered for framing.

An example in which the OTN data frame in the second possible implementation is used in an ODU frame is used to describe the second possible implementation. A conventional ODU frame has a structure of four rows and 3824 columns, and frame header information (framing indication information) and overhead information of the conventional ODU frame occupy fixed proportions in an entire ODU frame structure, which are 6/(3808×4)=0.039% and 58/(3808×4)=0.38% respectively. If the ODU frame corresponds to a 400G interface, fixed bandwidths of 156 Mbit/s and 1.52 Gbit/s are consumed, thereby reducing bandwidth utilization.

According to the solution provided in this application, an optimized ODU frame in which sharing is performed between frame header information and overhead information is designed. For example, eight bytes are designed as a shared area of the frame header information and the overhead information. A payload area is still 4×3808 bytes, namely, 1904 8-bytes.

In an initial phase, the framing indication information is in a high-frequency state, and 8-byte frame header information is periodically sent according to a frame period T. In a normal working phase, the framing indication information enters a low-frequency state. The framing indication information is sent once each 256×T period. Overhead information is sent for 255 times each 256×T period. The overhead information is sent by using overhead positions (8 bytes) of 255 ODU frames in one multiframe formed by 256 ODU frames.

A proportion of the shared area of the framing indication information and the overhead information in an entire ODU frame is 8/(1904×8)=0.05%. Compared with a fixed proportion (0.38%+0.039%=0.419%) of the framing indication information and the overhead information in the conventional ODU frame, the proportion of the shared area of the framing indication information and the overhead information in the optimized ODU frame is reduced, to improve the bandwidth utilization.

An example in which the OTN data frame in the second possible implementation is used in a FlexO frame is used to describe the second possible implementation.

A conventional FlexO frame has a structure of 128 rows and 5140 bit columns, and frame header information and overhead information that are of the conventional FlexO frame occupy fixed proportions in an entire FlexO frame structure, which are 960/(128×5140)=0.15% and 320/(128×5140)=0.05% respectively. If the FlexO frame corresponds to the 400G interface, fixed bandwidths of 1400G×0.15%=600 Mbit/s and 400G×0.05%=200 Mbit/s are consumed, thereby reducing the bandwidth utilization.

According to the solution provided in this application, an optimized FlexO frame in which bandwidth sharing is performed between frame header information and overhead information is designed. For example, 480 bits are designed as a shared area of the frame header information and the overhead information. A payload area changes to 128×5140−480 bits, namely, 657440 bits.

In an initial phase, the frame header information is in a high-frequency state, and 480-bit frame header information is periodically sent according to the frame period T.

In a normal working phase, the frame header information enters a low-frequency state. The frame header information is sent once each 256×T period, and the overhead information is sent 255 times each 256×T period. The overhead information is sent by using frame header positions (48 bits) of 255 FlexO frames in one multiframe formed by 256 FlexO frames.

A proportion of the shared area of the framing indication information and the overhead information in an entire FlexO frame is 480/657440=0.07%. Compared with a fixed proportion (0.15%+0.05%=0.2%) of the framing indication information and the overhead information in the conventional FlexO, the proportion of the shared area of the framing indication information and the overhead information in the optimized FlexO frame is reduced, to improve the bandwidth utilization.

The following describes in detail the third possible implementation.

In the third possible implementation, the first possible implementation and the second possible implementation are combined. In OTN data frames at different transmission rates, lengths of overhead areas are fixed. The overhead area is a shared area of overhead information and framing indication information. Specifically, the OTN data frame provided in the third possible implementation includes an overhead area and a payload area, and the payload area is used to carry the service data. The OTN data frame is classified into a first-type data frame and a second-type data frame. An overhead area included in the first-type data frame carries framing indication information, and an overhead area included in the second-type data frame carries overhead information of the service data. A length of the payload area is positively correlated with a transmission rate of the OTN data frame, and a length of the overhead area is a fixed value.

The OTN data frame in the third possible implementation is used in an OTN frame, for example, an ODU frame or an OTU frame, or is used in a FlexO frame.

Related descriptions in the first possible implementation and the second possible implementation are applicable to this embodiment, and details are not described herein again.

An example in which the OTN data frame is used in the OTN frame, for example, the ODU frame or the OTU frame. h overhead code blocks are inserted into each k×(m+h)−h payload code blocks to form one OTN data frame. In other words, one OTN data frame includes k×(m+h)−h payload code blocks and h overhead code blocks. The OTN data frame structure includes k×(m+h) code blocks. Alternatively, h overhead code blocks are inserted into each k×n payload code blocks to form one OTN data frame. In other words, one OTN data frame includes k×n payload code blocks and h overhead code blocks. The OTN data frame structure includes k×n+h code blocks. For example, a size of the code block is 128 bits, n=952 and n is a fixed constant, and h is a size of one code block. Refer to the related calculation method in FIG. 4. In a 400G OTN data frame, an 800G OTN data frame, and a 1.6 T OTN data frame, bandwidths occupied by overhead areas are 420 Mbit/s. For more embodiments, refer to more examples mentioned in the second implementation.

In an initial phase, framing indication information is in a high-frequency state, and 128-bit overhead code blocks are used to carry the frame header information. Alternatively, 64 bits (8 bytes) is used to carry the frame header information, and the other 64 bits are used to carry overheads or data other than the frame header information. The frame header information is periodically sent according to the frame period T. In a normal working phase, the frame header information enters a low-frequency state. The frame header information is sent once each 128×T period. A 128-bit overhead code block is used as complete overhead information, and is sent 127 times each 128×T period. Overhead information is sent by using an overhead position (64 bits) of one OTN frame that carries the frame header information and overhead positions (128 bits) of remaining 127 OTN frames in one multiframe formed by 128 OTN frames.

Based on a same concept as the foregoing embodiments, this embodiment of this application further provides a service data processing apparatus. The method, the apparatus, and the system are based on a same concept. Because problem-resolving principles of the method, the apparatus, and the system are similar, mutual reference is made between implementation of the apparatus and implementation of the method, and no repeated description is provided.

Figure 9:
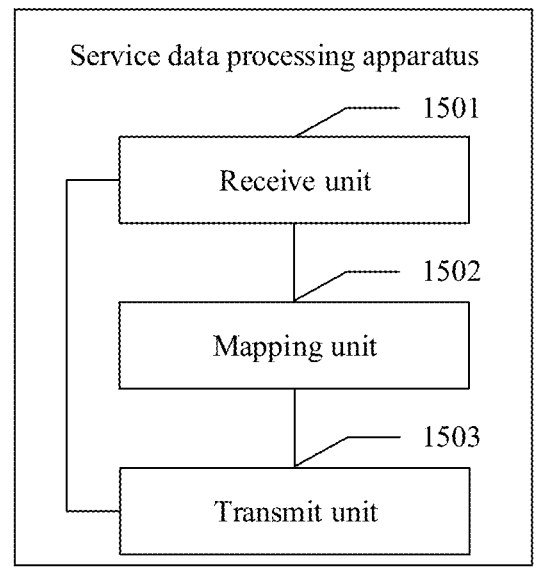
FIG. 9 is a schematic diagram of a structure of a service data processing apparatus according to an embodiment of this application.

The apparatus is used in the transmit end, namely, an OTN device at the transmit end. The apparatus is specifically a processor, a chip, a chip system, a module, in the processor, that is configured to perform a function of the transmit end, or the like. The apparatus is implemented by the tributary board and/or the line board in FIG. 2. As shown in FIG. 9, the apparatus includes a receive unit 1501, a mapping unit 1502, and a transmit unit 1503. The receive unit 1501 is configured to perform S701, the mapping unit 1502 is configured to perform S702, and the transmit unit 1503 is configured to perform S703 or S1102 and S1103. Optionally, the three units further perform other related optional steps performed by the transmit end mentioned in any one of the foregoing embodiments, and details are not described herein again.

Figure 10:
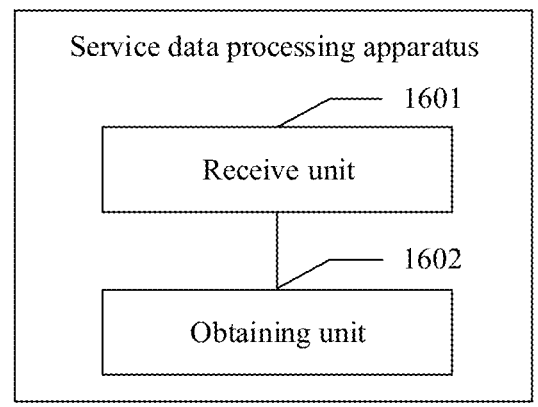
FIG. 10 is a schematic diagram of a structure of another service data processing apparatus according to an embodiment of this application.

An embodiment of this application further provides another service data processing apparatus. The apparatus is used in a receive end, namely, an OTN device at the receive end. The apparatus is specifically a processor, a chip, a chip system, a functional module for receiving, or the like. A function of the apparatus is implemented by the tributary board and/or the line board shown in FIG. 2. As shown in FIG. 10, the apparatus includes a receive unit 1601 and an obtaining unit 1602. The receive unit 1601 is configured to perform S704 or S1103, S1104, and S1104, and the obtaining unit 1602 is configured to perform S705. Optionally, the three units further perform other related optional steps, mentioned in any one of the foregoing embodiments, that are performed by the receive end. Details are not described herein again.

In this embodiment of this application, division into units is an example, and is merely a logical function division. In an actual implementation, another division manner is used. In addition, functional units in the embodiments of this application is integrated into one processor, or exist alone physically. Alternatively, two or more units are integrated into one unit. The integrated unit is implemented in a form of hardware, or is implemented in a form of a software functional unit.

Figure 11:
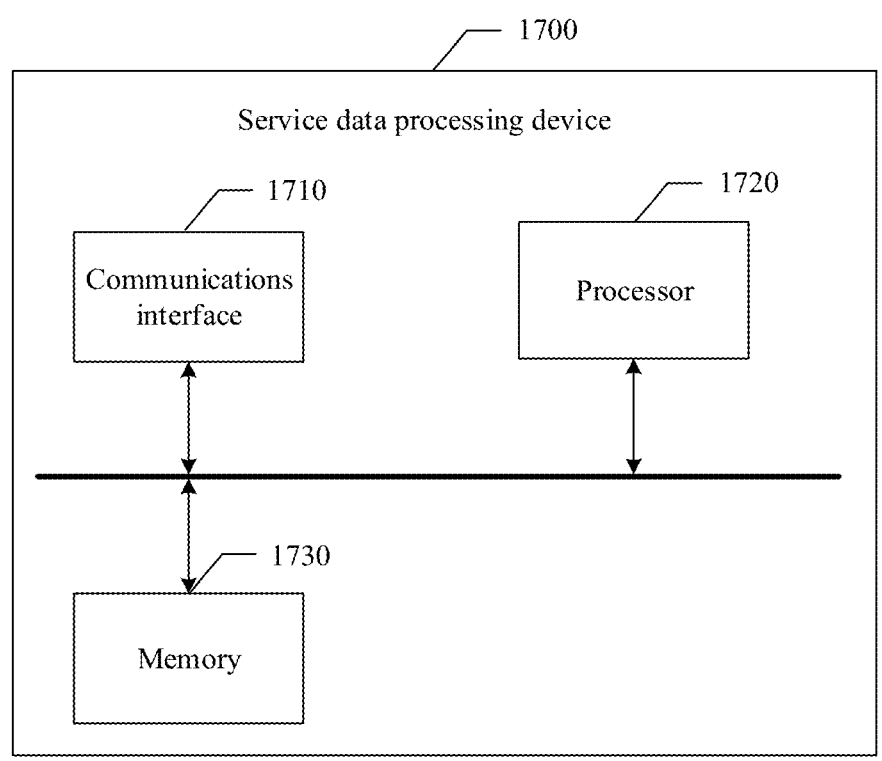
FIG. 11 is a schematic diagram of a structure of still another service data processing device according to an embodiment of this application.

The embodiments of this application further provide another structure of a service data processing device. As shown in FIG. 11, a device 1700 includes a communications interface 1710, a processor 1720, and a memory 1730. The device is used in a transmit end and a receive end.

When the device is used in the transmit end, the receive unit 1501, the mapping unit 1502, and the transmit unit 1503 shown in FIG. 9 are implemented by the processor 1720. For example, the processor 1702 is the signal processor in the tributary board and/or the signal processor in the line board shown in FIG. 2. The processor 1720 receives service data through the communications interface 1710, and is configured to implement the methods performed by the transmit end in FIG. 3 and FIG. 6. In an implementation process, each step of a processing procedure completes, by using an integrated logic circuit of hardware in the processor 1720 or an instruction in a form of software, the method performed by the transmit end in FIG. 3 or FIG. 6.

When the device is used in the receive end, the receive unit 1601 and the obtaining unit 1602 is implemented by the processor 1720. For example, the processor 1702 is the signal processor in the tributary board and/or the signal processor in the line board shown in FIG. 2. The processor 1720 receives the service data through the communications interface 1710, and is configured to implement the methods performed by the receive end in FIG. 3 and FIG. 6. In the implementation process, each step of the processing procedure completes, by using the integrated logic circuit of hardware in the processor 1720 or the instruction in the form of software, the method performed by the receive end in FIG. 3 or FIG. 6.

The communications interface 1710 in this embodiment of this application is a circuit, a bus, a transceiver, or any other apparatus that is configured to exchange information. For example, the other apparatus is a device connected to the device 1700. For example, when the device 1700 is used in the transmit end, the other apparatus is a receive end or an intermediate node.

In this embodiment of this application, the processor 1720 is a general-purpose processor, a digital signal processor, an application-specific integrated circuit, a field programmable gate array or another programmable logic device, a discrete gate or transistor logic device, or a discrete hardware component. The processor 1720 implements or execute the methods, steps, and logical block diagrams disclosed in this embodiment of this application. The general-purpose processor is a microprocessor, any conventional processor or the like. The steps of the method disclosed with reference to the embodiments of this application is directly performed by a hardware processor, or is performed by using a combination of hardware in the processor and a software unit. Program code executed by the processor 1720 to implement the foregoing methods are stored in the memory 1730. The memory 1730 is coupled to the processor 1720. Coupling in this embodiment of this application is indirect coupling or a communication connection between apparatuses, units, or modules in an electrical form, a mechanical form, or another form, and is used for information exchange between the apparatuses, the units, or the modules. The processor 1720 cooperates with the memory 1730. The memory 1730 is a nonvolatile memory, for example, a hard disk drive (HDD) or a solid-state drive (SSD), or is a volatile memory, for example, a random access memory (RAM). The memory 1730 is any other medium that is used to carry or store expected program code in a form of an instruction or a data structure and that is accessed by a computer, but is not limited thereto.

In this embodiment of this application, a specific connection medium among the communications interface 1710, the processor 1720, and the memory 1730 is not limited. In this embodiment of this application, in FIG. 11, the memory 1730, the processor 1720, and the communications interface 1710 are connected through the bus. The bus is represented by using a thick line in FIG. 11, and a connection manner between other components is merely described as an example, and is not limited thereto. The bus is classified into an address bus, a data bus, a control bus, and the like. For ease of representation, one thick line is used to represent the bus in FIG. 11, but this does not mean that there is one bus or one type of bus.

Based on the foregoing embodiments, the embodiment of this application further provides a computer storage medium. The storage medium stores a software program, and when the software program is read and executed by one or more processors, the method provided in any one or more of the foregoing embodiments are implemented. The computer storage medium includes any medium that stores program code, such as a USB flash drive, a removable hard disk, a read-only memory, or a random access memory.

Based on the foregoing embodiments, the embodiment of this application further provides a chip. The chip includes a processor and is configured to implement functions in any one or more of the foregoing embodiments, for example, obtaining or processing a data frame in the foregoing method. Optionally, the chip further includes a memory. The memory is configured to store a program instruction and data that are executed by the processor. The chip includes a chip, or includes a chip and another discrete device.

A person skilled in the art should understand that the embodiments of this application is provided as a method, a system, or a computer program product. Therefore, this application is configured to use a form of hardware only embodiments, software only embodiments, or embodiments with a combination of software and hardware. Moreover, this application is configured to use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. Computer program instructions are used to implement each process and/or each block in the flowcharts and/or the block diagrams and a combination of a process and/or a block in the flowcharts and/or the block diagrams. These computer program instructions are provided for a general-purpose computer, a special-purpose computer, an embedded processor, or a processor of any other programmable data processing device to generate a machine, so that the instructions executed by a computer or a processor of any other programmable data processing device generates an apparatus for implementing a specific function in one or more processes in the flowcharts and/or in one or more blocks in the block diagrams.

These computer program instructions are also stored in a computer-readable memory that indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions are also loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A service data processing method, comprising:
receiving, by a transmit end, service data;
mapping, by the transmit end, the service data to a plurality of optical transport network (OTN) data frames, wherein
the OTN data frame comprises:
an overhead area, the overhead area is used to carry overheads of the service data, and a length of the overhead area is a fixed value and remains constant as a transmission rate of the OTN data frame changes; and
a payload area, the payload area is used to carry the service data, and a length of the payload area is positively correlated with the transmission rate of the OTN data frame and increases as the transmission rate of the OTN data frame increases; and
sending, by the transmit end, the plurality of OTN data frames.

2. The method according to claim 1, wherein the payload area comprises:
k×n−x payload code blocks; and
wherein the overhead area comprises:
h overhead code blocks;
wherein k corresponds to the transmission rate of the OTN data frame, and k, n, and h are positive integers, and x is an integer greater than or equal to 0.

3. The method according to claim 1, further comprising:
sending, by the transmit end, an identifier to a receive end, wherein the identifier is used to identify the transmission rate of the OTN data frame.

4. The method according to claim 3, wherein the sending, by the transmit end, the identifier to the receive end comprises:
performing, by the transmit end, forward error correction (FEC) encoding on each OTN data frame to obtain an FEC frame, wherein the FEC frame carries the identifier;
processing, by the transmit end configured to use a digital signal processor (DSP) on each OTN data frame to obtain a DSP frame, wherein the DSP frame carries the identifier; or
sending, by the transmit end, the identifier through an optical supervisory channel.

5. The method according to claim 3, wherein the sending, by the transmit end, the identifier to the receive end comprises:
when the OTN data frame is a lower-order optical data unit (ODU) frame, mapping, by the transmit end, a plurality of lower-order ODU frames to at least one tributary slot of a higher-order ODU frame and sending the higher-order ODU frame, wherein a field used to carry overhead information of the at least one tributary slot in the higher-order ODU frame carries the identifier.

6. The method according to claim 3, wherein the identifier is a value of k.

7. The method according to claim 2, wherein n=m+h, where x=h, and m is a positive integer.

8. The method according to claim 1, wherein the plurality of OTN data frames comprise:
a first-type data frame, where an overhead area comprised in the first-type data frame carries framing indication information; and
a second-type data frame, where an overhead area comprised in the second-type data frame carries overhead information of the service data.

9. The method according to claim 8, wherein the method further comprises:
sending, by the transmit end, a second group of data frames after sending, to a receive end, a first group of data frames formed by a plurality of consecutive first-type data frames,
wherein the second group of data frames comprises the first-type data frame and the second-type data frame, and in the second group of data frames, there are a plurality of second-type data frames between any two first-type data frames.

10. The method according to claim 9, wherein the second group of data frames comprises a plurality of multiframes, each of the plurality of multiframes comprises one first-type data frame and the plurality of second-type data frames, and the first-type data frame has a same position in different multiframes.

11. The method according to claim 8, wherein the overhead area comprised in the OTN data frame comprises a multiframe indication field, and the multiframe indication field is used to indicate whether the OTN data frame is the first-type data frame or the second-type data frame.

12. A service data processing apparatus, comprising a processor and a memory, wherein
the memory is configured to store program code; and
the processor is configured to read and execute the program code stored in the memory, to implement a method that comprises:
receiving, by a transmit end, service data;
mapping, by the transmit end, the service data to a plurality of optical transport network (OTN) data frames, wherein
the OTN data frame comprises:
an overhead area, where the overhead area is used to carry overheads of the service data, and a length of the overhead area is a fixed value and remains constant as a transmission rate of the OTN data frame changes; and
a payload area, where the payload area is used to carry the service data, and a length of the payload area is positively correlated with the transmission rate of the OTN data frame and increases as the transmission rate of the OTN data frame increases; and
sending, by the transmit end, the plurality of OTN data frames.

13. The service data processing apparatus according to claim 12, wherein the payload area comprises;
k×n−x payload code blocks; and
wherein the overhead area comprises:
h overhead code blocks;
wherein k corresponds to the transmission rate of the OTN data frame;
wherein k, n, and h are positive integers, and x is an integer greater than or equal to 0.

14. The service data processing apparatus according to claim 12, wherein the method further comprises:
sending, by the transmit end, an identifier to a receive end, wherein the identifier is used to identify the transmission rate of the OTN data frame.

15. The service data processing apparatus according to claim 14, wherein the sending the identifier to the receive end comprises:

performing, by the transmit end, forward error correction (FEC) encoding on each OTN data frame to obtain an FEC frame, wherein the FEC frame carries the identifier;

processing, by the transmit end configured to use a digital signal processor (DSP) on each OTN data frame to obtain a DSP frame, wherein the DSP frame carries the identifier; or sending, by the transmit end, the identifier through an optical supervisory channel.

16. The service data processing apparatus according to claim 14, wherein the sending the identifier to the receive end comprises:

when the OTN data frame is a lower-order optical data unit (ODU) frame, mapping, by the transmit end, a plurality of lower-order ODU frames to at least one tributary slot of a higher-order ODU frame and sending the higher-order ODU frame, wherein a field used to carry overhead information of the at least one tributary slot in the higher-order ODU frame carries the identifier.

17. The service data processing apparatus according to claim 14, wherein the identifier is a value of k.

18. The service data processing apparatus according to claim 13, wherein n=m+h, x=h, and m is a positive integer.

19. The service data processing apparatus according to claim 12, wherein the plurality of OTN data frames comprise:

a first-type data frame, where an overhead area comprised in the first-type data frame carries framing indication information; and a second-type data frame, where an overhead area comprised in the second-type data frame carries overhead information of the service data.

20. The service data processing apparatus according to claim 18, wherein the method further comprises:

sending, by the transmit end, a second group of data frames after sending, to a receive end, a first group of data frames formed by a plurality of consecutive first-type data frames, wherein the second group of data frames comprises a first-type data frame and a second-type data frame, and in the second group of data frames, there are a plurality of second-type data frames between any two first-type data frames.

21. The service data processing apparatus according to claim 20, wherein the second group of data frames comprises a plurality of multiframes, where each of the plurality of multiframes comprises:

a first-type data frame and the plurality of second-type data frames, and the first-type data frame has a same position in different multiframes.

22. The service data processing apparatus according to claim 19, wherein the overhead area comprised in the OTN data frame comprises a multiframe indication field, and the multiframe indication field is used to indicate whether the OTN data frame is the first-type data frame or the second-type data frame.

* * * * *